United States Patent [19]

Earley, III et al.

[11] Patent Number: 5,683,490
[45] Date of Patent: Nov. 4, 1997

[54] SOLUTION MINING OF PRECIOUS METALS USING AQUEOUS, SULFUR-BEARING SOLUTIONS AT ELEVATED TEMPERATURES

[75] Inventors: Drummond Earley, III, St. Paul; Michael E. Berndt, Bloomington, both of Minn.

[73] Assignee: The United States of America as represented by the Secretary of the Interior, Washington, D.C.

[21] Appl. No.: 663,607

[22] Filed: Jun. 14, 1996

Related U.S. Application Data

[63] Continuation of Ser. No. 363,119, Dec. 23, 1994, abandoned.

[51] Int. Cl.$^6$ .................................................. C22B 3/40
[52] U.S. Cl. .................................. 75/712; 75/736; 75/744
[58] Field of Search .............................. 75/712, 736, 744

[56] References Cited

U.S. PATENT DOCUMENTS 1,372,973  3/1921  Middleton .................................. 75/736

OTHER PUBLICATIONS

Chemistry 2nd Edition, McGraw–Hill, 1961, pp. 524 and 525.

Primary Examiner—Sam Silverberg
Attorney, Agent, or Firm—E. Philip Koltos

[57] ABSTRACT

Metallic forms of gold and other precious metals can be dissolved and transported (mined) using an aqueous sulfide-bearing leach solution. Maximum sulfur fugacities are achieved in sulfide-bearing solutions under approximately neutral pH and relatively reducing conditions. The optimum chemical conditions are achieved specifically by heating an aqueous sulfide solution such as NaHS, $Na_2S$, $H_2S$, $(NH)_4S$, or other suitable forms to temperatures of at least about 100° C. in the presence of excess elemental sulfur. The sulfide dissociates in the solution to form aqueous sulfide species including polysulfide and $HS^-$ which lixivate gold and other precious metals.

14 Claims, 10 Drawing Sheets

SOLUTION MINING OF PRECIOUS METALS USING AQUEOUS, SULFUR-BEARING SOLUTIONS AT ELEVATED TEMPERATURES

This application is a continuation of application Ser. No. 08/363,119 filed Dec. 23, 1994 now abandoned.

FIELD OF THE INVENTION

The present invention relates to extracting and processing precious metals for ore deposits and other types of precious metals resources.

BACKGROUND OF THE INVENTION

Precious metals are most efficiently recovered by leaching or lixiviation, such as by solution mining and/or hydrometallurgical extraction. The types of solution mining and hydrometallurgical practices that have heretofore been used to deliver and recover leach solutions are varied: in situ mining, heap mining, and vat leaching mining systems are the major types of mining for precious metals.

In situ mining is defined herein as a solution mining technique that uses wells and pumps to distribute leach solutions in a virtually undisturbed ore body, wherein leach solutions selectively dissolve the target ore minerals, thereby bringing into solution the metals of interest, as shown in FIG. 1. The metal-laden solutions are then collected by the well system or other types of underground workings, and pumped to the surface for processing.

Heap leaching refers to solution mining of ores that have been displaced, energetically reduced to rubble or finer material, and transported to a designated area where the ore is heaped into a large pile, usually atop a hydrologically impermeable barrier (cf. FIG. 2). Leach solutions are then applied to the top of the heap and percolate through the ore particles, dissolving the target metal until they reach the pad or base of the pile where they are collected for processing.

Vat leaching means leaching of ore particles in a flooded tank, as shown in FIG. 3, that contains an inlet and outlet for the leach solutions. Fresh leach solutions flow through the inlets where they encounter and leach metals from ore particles. Metal laden solutions are then retrieved via outlets for processing.

While leaching systems for heap and vat solution mining of precious metals are well established, in situ mining of precious metals is almost nonexistent because this technique requires a leaching system that has very special properties.

First, there are not yet available an array of environmentally acceptable, selective lixiviants which can be used to dissolve the primary ore minerals of a given deposit without reacting strongly with gangue minerals or generating adverse byproducts. Additionally, the leaching rates of these reactions must be relatively high, and suitable means for recovering metals from the lixiviant must be available.

Second, the means to circulate and contain leach solutions must be developed, as a high percentage of the target minerals must be contacted as leach solutions are distributed throughout the ore body. The residence time of solutions also must be sufficiently low to facilitate economically viable metal transport rates.

There are several major classes of leaching agents used in the solution mining and hydrometallurgy of precious metal ores. The focus on gold in most of the studies reported herein results from the fact that gold usually occurs in metallic form in most ore deposits, and is usually the target commodity when present in economic concentrations. The leaching chemistry of metallic silver, and gold-silver alloys (electrum), however, is very similar to that of gold in many of these systems.

Most modern heap and vat leaching of gold ores is based upon the cyanidization process invented by MacArthur et al., (1887, 1889, 1.b). Aqueous alkaline sodium cyanide solutions are the most widely used leach solutions for heap and vat leaching of precious metals. Gold is relatively soluble in cyanide ($CN^{-1}$)-bearing solutions because of the formation of the aurous-cyanide ion:

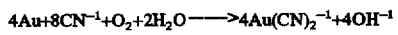

This cyanide complex is very stable and has a relatively large predominance in terms of pH and redox conditions at 25° C. (Xue and Osseo-Assare, 1985). Efficient cyanide leaching requires a pH of greater than 9 and relatively oxidizing conditions. High alkalinity prevents the formation of poisonous cyanide gas and subsequent loss of the reagent via simplified reactions such as:

or

Lime is usually mixed with the ore material in order to maintain alkaline conditions. Oxidizing conditions are required to ionize metallic gold to its aurous state such that aurous-cyanide complexes can form. This is usually achieved by enhanced aeration or chemical oxidants such as hydrogen peroxide (Loroesch et al. 1989). While widely used in a variety of mining and hydrometallurgical processes, the cyanidization process poses some potential problems. First and foremost is the toxicity of cyanide itself, even in very low concentrations (Sax, 1992). Cyanide eventually degrades to carbon dioxide and ammonia in most natural environments. However, the rate of degradation and reaction paths differ greatly depending upon the local chemical and physical conditions (Smith and Struhsacker, 1988; Chatwin, 1989). Cyanide leach solutions thus must be contained until the total cyanide content is close to or below EPA drinking water standards (0.2 mg/L) in most states. However, in those states where precious metal mining activity is heaviest, cyanide discharge regulations are administered on a case by case basis (Smith and Struhsacker, 1988). The requisite alkalinities and oxidizing conditions also impose economic and operational constraints with regard to costs of reagents such as lime and hydrogen peroxide, and/or aeration of the ore. Cyanidization does not work well on sulfide-bearing ores because sulfide minerals react with and consume cyanide as well as oxidants (Bhappu, 1986; Avraamides, 1982; von Michaelis, 1987; Hiskey and Atluri, 1988; Yannopoulos, 1991). Oxidation of sulfides also generates free acid which must be neutralized by increasing the lime application rate over that of sulfide-free ores. Cyanide is ineffective in leaching carbonaceous ores because cyanide adsorbs to graphite particles and because it is difficult to oxidize gold in the locally reducing microenvironment near or within carbonaceous particles (Bhappu, 1986; Avraamides, 1982; Hiskey and Atluri, 1988; Yannopoulos, 1991).

Gold and silver are recovered from metal-laden cyanide solutions in a variety of ways. The most widely used techniques are:

(1) reductive precipitation of metallic gold or silver using zinc or other appropriate transition metals;

(2) adsorption of gold-cyanide complexes onto activated carbon;

(3) ion exchange with a resin or solvent;

(4) direct electroplating of gold onto a cathode (Yannopoulos, 1991).

All of these techniques, with the exception of (1), involve a considerable capital risk because they require complex processing plants that are labor intensive and must be constructed with stringent and sometimes inflexible hardware requirements. Once built, the processing system may be difficult and expensive to adapt to changing conditions as the ore deposit is developed. Processing systems for cyanidization are usually less complicated, however, than those designed for the alternative leaching systems described below.

Thiourea

Although presently cyanidization is predominantly used for leaching precious metals, much research has been conducted on alternative lixiviants for precious metals (Avraamides, 1982; yon Michaelis, 1987; Hiskey and Atluri, 1988, Yannopoulos, 1991). Most of this research has concentrated on alternative lixiviants for so-called "refractory ores" such as those containing sulfide gangue or ore minerals and carbonaceous ores. Plaskin and Kozhukhova (1941; 1960) originally developed aqueous thiourea solutions $[CS(NH_2)_2]$ for leaching precious metals from refractory ores; these solutions can achieve precious metal extractions and leaching rates that match or even exceed cyanide under certain conditions (Eisele et al., 1988; Avraamides, 1982; von Michaelis, 1987; Hiskey and Atluri, 1988, Yannopoulos, 1991). However, thiourea is more expensive than cyanide, and is usually used in higher concentrations and is lost more readily during the leaching operation. Therefore, the economic aspects usually favor cyanidization except for refractory ores (Eisele et al., 1988; Avraamides, 1982; yon Michaelis, 1987; Hiskey and Atluri, 1988, Yannopoulos, 1991). Like cyanide, thiourea leaching also requires an oxidant, such as ferric iron or hydrogen peroxide. However, thiourea leaching operates most efficiently at very acidic conditions, pH less than 1, which poses operational problems in terms of handling materials, corrosion, and maintaining low pH conditions. Processing thiourea solutions to recover gold is more complex that for cyanide solutions (Eisele et al., 1988; Avraamides, 1982; yon Michaelis, 1987; Hiskey and Atluri, 1988, Yannopoulos, 1991), which also adversely affects the economics. While thiourea itself is considered nontoxic in aqueous solutions, it is carcinogenic to animals and potentially, therefore, to humans (Karstadt and Bobal, 1982). Furthermore, gold- and silver-thiourea complexes are strongly absorbed onto clay minerals (von Michaelis, 1987) which also contributes to metal value and reagent losses, and increased potential for adverse environmental impacts. Adsorption of thiourea complexes may necessitate the implementation of costly restoration actions during mine closure.

Thiosulfate

Gold and silver also dissolve, albeit slowly, in aqueous thiosulfate $(S_2O_3^{-2})$ solutions. Several patents disclose the use of thiosulfate extraction of precious metals in sulfidic ores, namely, Genik-Sas-Berezowsky et al., U.S. Pat. No. 4,070,182; Kerley, U.S. Pat. No. 4,269,622; and Kerley, U.S. Pat. No. 4,369,061. Thiosulfate leaching uses cupric ions in solution to catalyze the reaction in some systems, which can be detrimental to carbon in pulp processing (Muir et al., 1989). Thiosulfate is metastable with respect to sulfate under normal leaching conditions, but the stability of thiosulfate is enhanced in the presence of sulfite ion (Kerley, 1983). Moderately alkaline conditions, i.e., pH above about 7.5, and an oxidant such as ferric or cupric ion are required. Ammonia is also required in some cases in order to stabilize cupric ions in solution. The main technical and economic difficulties relate to the metastability of sulfite ion, the relatively slow recovery rates, and complex processing systems associated with thiosulfate leaching (Avraamides, 1982; von Michaelis, 1987; Hiskey and Atluri, 1988, Yannopoulos, 1991).

A few other alternative lixiviants to cyanide have been proposed (see Avraamides, 1982 and Hiskey and Atluri, 1988 for examples), but most of these suffer from the same disadvantages as the alternative lixiviants described above, and have never been widely used in commercial settings. Among the list of lesser know alternative lixiviants are polysulfides; gold-polysulfide complexes are second only to gold-cyanide complexes with respect to stability (Peshchevitskii and Blevantsev, 1976), so that they are very effective in transporting gold. Only a few leaching studies have been conducted with polysulfides (Kakavskii and Tyurni, 1962; Peschevitski and Belevantsev, 1976; Louw et al., 1977). Louw et al. suggested the commercial use of polysulfides for leaching refractory arsenical gold ores, but the polysulfides heretofore have not been used in leaching operations, probably because the chemistry of these species is complex and was poorly understood.

Chamberlain and Pojar, 1984 and Wincup et al., 1989, disclose limited examples of in situ precious metals mining operations. However, the technology of these operations cannot be used to recover most of the remaining U.S. precious metal reserves and resources, mainly because of environmental concerns associated with conventional lixiviants. These concerns have even stalled efforts to mine Oregon precious metal deposits using conventional heap leaching techniques.

The status of in situ mining of precious metals was recently summarized by Earley et al., 1990. These authors concluded that the principal problems relating to in situ mining of precious metal ores are the low permeability of some deposits, detrimental textures (e.g., encapsulation of ore minerals in gangue), and lack of an effective and environmentally acceptable lixiviant. Thus, two key tasks must be accomplished before in situ mining becomes a widely used mining technique. First, an environmentally acceptable, selective lixiviant must be developed that can be used to dissolve the primary ore minerals of any given deposit without reacting strongly with gangue minerals or generating adverse byproducts. In addition, the leaching rates of such reactions must be relatively high and suitable methods for recovering metals from the lixiviant must be available. Second, the means to circulate and contain leach solution must be developed with the added requirements that a high percentage of the target minerals are contacted as leach solutions are distributed throughout the ore body, yet the residence time of solutions must also be low enough to facilitate economically viable metal transport rates.

Koneman, in U.S. Pat. No. 560,413, discloses recovering gold or silver from refractory ores by first introducing chlorine gas into the ore in order to oxidize and dissolve gold, and then obtaining purified gold by adding a reducing agent such as iron sulfate, sulfureted hydrogen, or the like.

Touto, in U.S. Pat. No. 4,605,537, discloses a method for removing residual hypochlorite contained in chlorinated slurries of gold-containing ores by reaction with sulfide ion-providing chemicals, preferably sodium hydrosulfide, sodium sulfide or hydrogen sulfide.

SUMMARY OF THE INVENTION

It is an object of the present invention to overcome the aforementioned disadvantages of the prior art.

It is another object of the present invention to use bisulfide- and polysulfide-based ligands to dissolve, complex and transport precious metals in solution for solution mining.

It is a further object of the present invention to use elevated temperature solutions for precious metal solution mining.

It is still another object of the present invention to use elevated temperature solutions for precious metal in situ mining.

It is yet another object of the present invention to use sulfur-based chemical buffers in solution mining to control and maintain chemical conditions in the ore matrix at optimum leaching conditions.

It is a further object of the present invention to use a leaching solution that operates at neutral pH and relatively reducing redox conditions that are similar to the conditions found in natural groundwaters, thus minimizing environmental degradation.

It is another object of the present invention to provide a leach solution that dissolves precious metals relatively rapidly and transports the precious metals under relatively reducing conditions, obviating the need for strong oxidizing agents.

It is yet another object of the present invention to provide a processing system that uses a reagent conservative, controlled boiling and precipitation process for metal value recovery.

According to the present invention, metallic forms of gold and other precious metals can be dissolved and transported (mined) using an aqueous sulfide-bearing leach solution. Maximum sulfur($S_2$) fugacities are achieved in sulfide-bearing solutions under approximately neutral pH and relatively reducing conditions. The optimum chemical conditions are achieved specifically by heating an aqueous sulfide solution containing bisulfide- and sulfur-forming reagents such as $NaHS$, $Na_2S$, $H_2S$, $(NH)_4S$, or other suitable forms to temperatures of about 100° C. or greater in the presence of excess elemental sulfur. The sulfide reacts with elemental sulfur to form aqueous polysulfide species as well as $HS^-$.

DETAILED DESCRIPTION OF THE INVENTION

Figure 1:
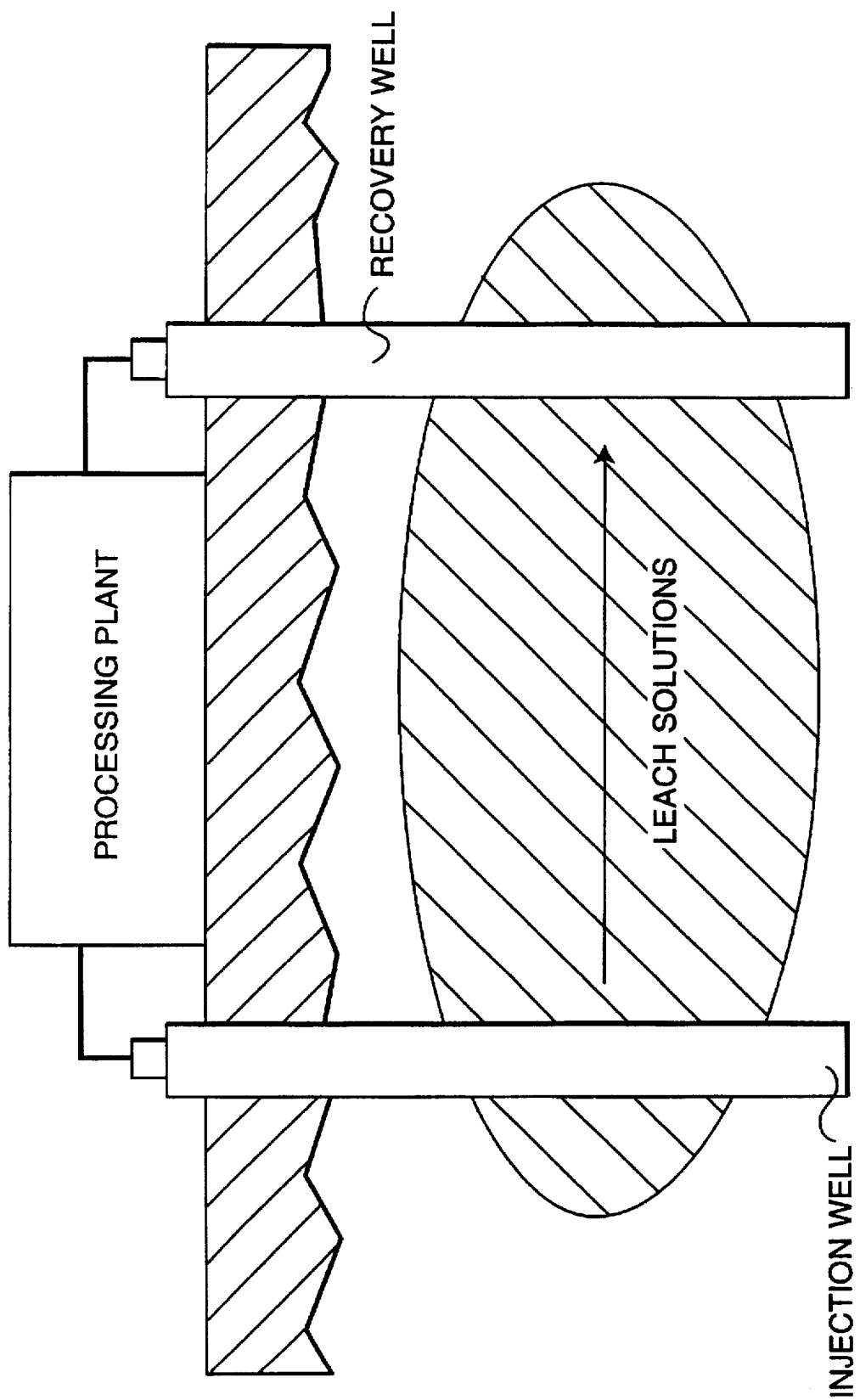
FIG. 1 illustrates the basic concept of in situ solution mining.
Figure 2:
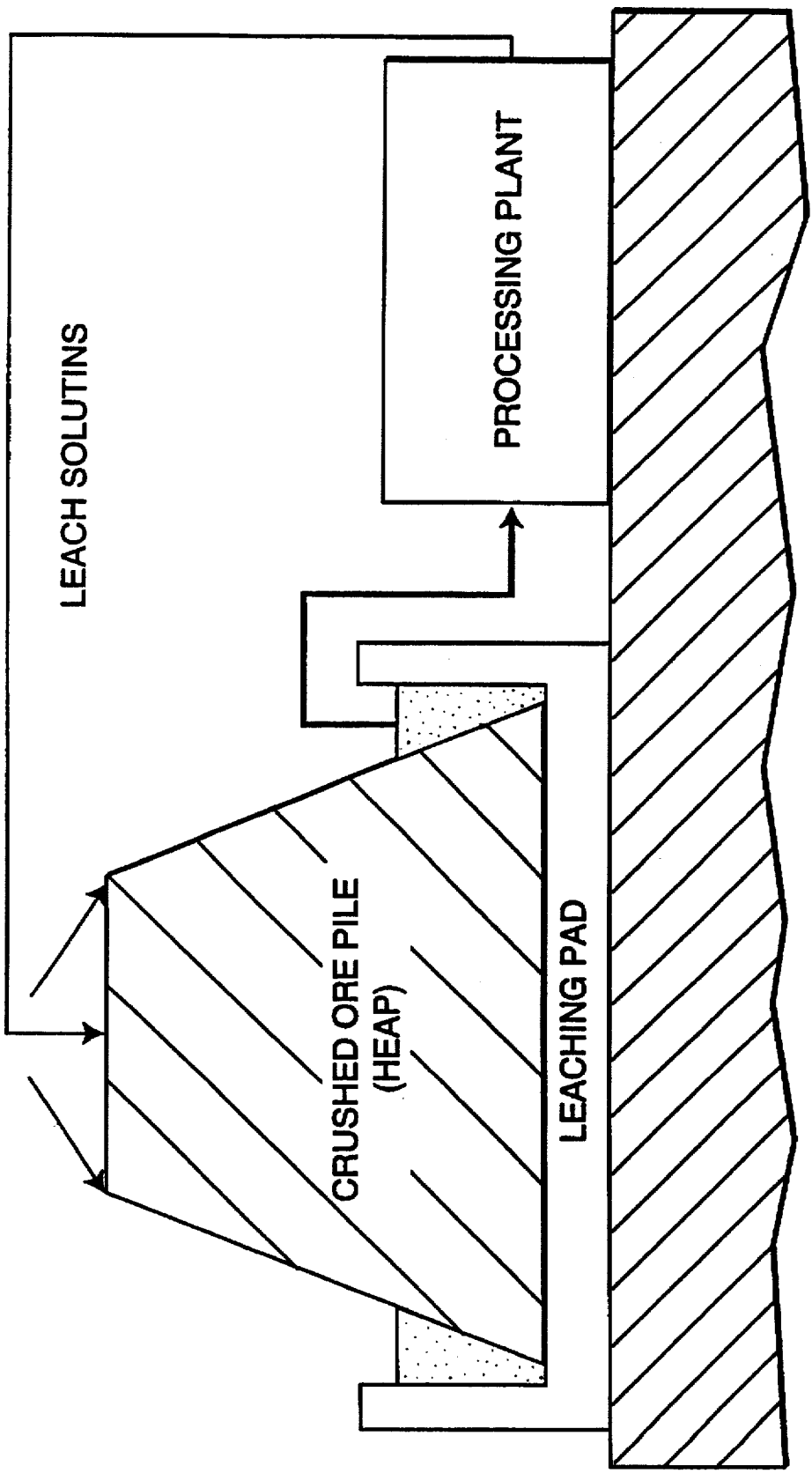
FIG. 2 illustrates the basic concept of heap solution mining.
Figure 3:
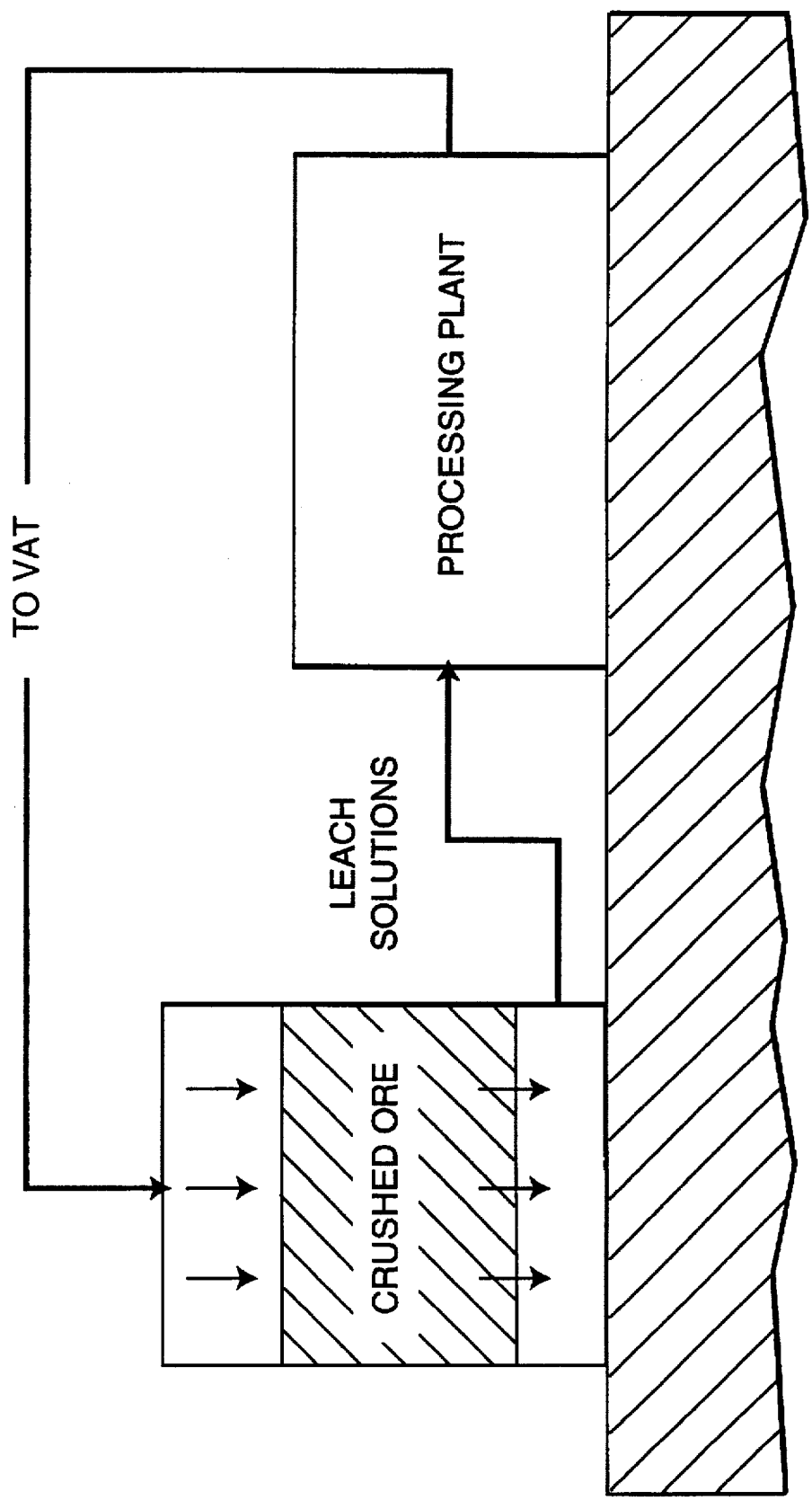
FIG. 3 illustrates the basic concept of vat solution mining.

The present invention provides an improved method for extracting and processing precious metals from ore deposits and other precious metals resources using the in situ mining method. This process greatly expands the amount of precious metal resources that can be mined safely and profitably with little or no environmental impact. Additionally, the leach solution of the present invention can be used in heap or vat leaching of precious metals with little risk to the environment.

According to the present invention, solution mining and hydrometallurgy of precious metals are improved by using as the leaching agent aqueous solutions of bisulfide and polysulfide ion-bearing solutions distributed within the intergranular pores of an ore body or otherwise amongst ore particles at elevated temperatures of at least about 100° C. and low to modest pressures above the vapor pressure curve for $H_2O$.

For the purpose of the present invention, the term "precious metals" includes gold and silver.

The sulfide-based ligands of the present invention are very effective in dissolving and transporting precious metals. Certain sulfide anions, such as bisulfide and polysulfide, $S_nS^{-2}$, n=1-7, are relativity large, low in charge, and polarizable. These ligands are classified as "soft" ligands (Pearson, 1963). Molecular orbital theory predict that these ligands will form relative strong bonds with "soft metals" such as gold, silver, platinum and palladium (Pearson, 1963). Therefore, it is believed that $HS^-$ and $S_nS^{-2}$ are also highly selective ligands with respect to precious metals, which minimizes the potential for competition of other, unwanted metals, for the sulfide ligands. It has been experimentally demonstrated that gold forms stable complexes such as $Au(HS)_2^{-1}$ and $Au(S_nS)^{-1}$ with $HS^-$ (Seward, 1973) and $S_nS^{-2}$ (Berndt et al., 1994), respectively, at elevated temperatures. Relatively high gold solubilities and leaching rates are achieved even at modest temperatures and pressures, i.e., from about 100°–150° C. and about 100 bars.

¡Metallic forms of precious metals can be dissolved and transported (mined) by an aqueous sulfide-bearing leach solution of the appropriate composition and maintained at the correct physical conditions. The present inventors have conducted experiments which demonstrated that gold solubilities are maximized at any given temperature and pressure when the $S_2$ fugacity is highest and under approximately neutral pH and relatively reducing conditions. The optimum chemical conditions are achieved specifically by heating an aqueous sulfide-bearing solution, wherein sulfide ion can be introduced from NaHS, $Na_2S$, $H_2S$, $(NH_4)_2S$, or other suitable sources. Optimal temperatures are generally equal to or greater than 100° C. The NaHS dissociates in the solution to form $Na^+$, $HS^-$ and other important aqueous sulfide species.

The following equation shows that $HS^-$ reacts with elemental sulfur to form polysulfides which are the predominant Au-complexing species at temperatures between 100° and 150° C. and at near neutral and relatively reducing conditions (Berndt et al., 1994):

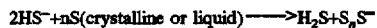

$$2HS^- + nS(\text{crystalline or liquid}) \longrightarrow H_2S + S_nS^-$$

Figure 4:
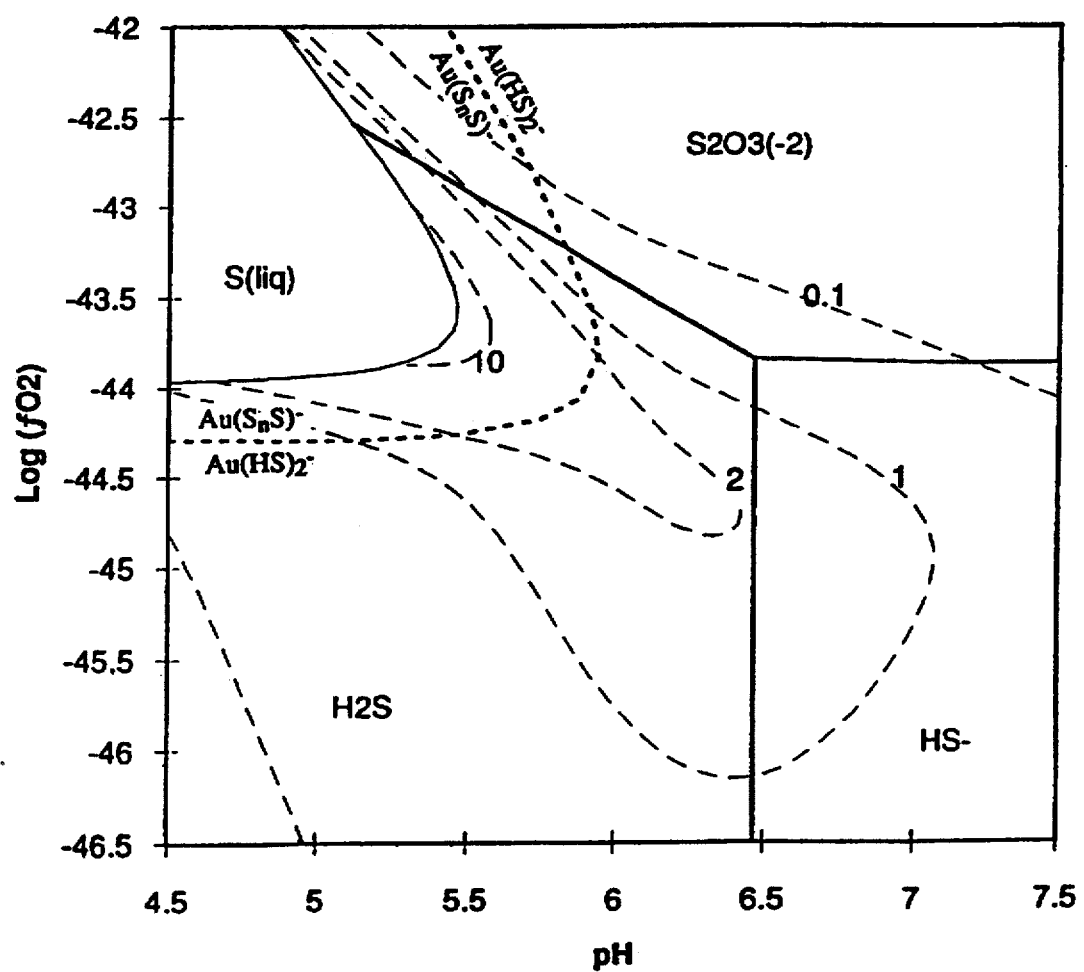
FIG. 4 shows the predicted gold solubility due to complexation with polysulfide and bisulfide as a function of pH and $fO_2$ at 150° C. and 100 bars assuming that the total sulfur concentration is equal to 15 mmol/kg, Contours in mg/kg dissolved gold, Enhancement of gold solubility by polysulfides is greatest in the region surrounding the sulfur saturation field.
Figure 5:
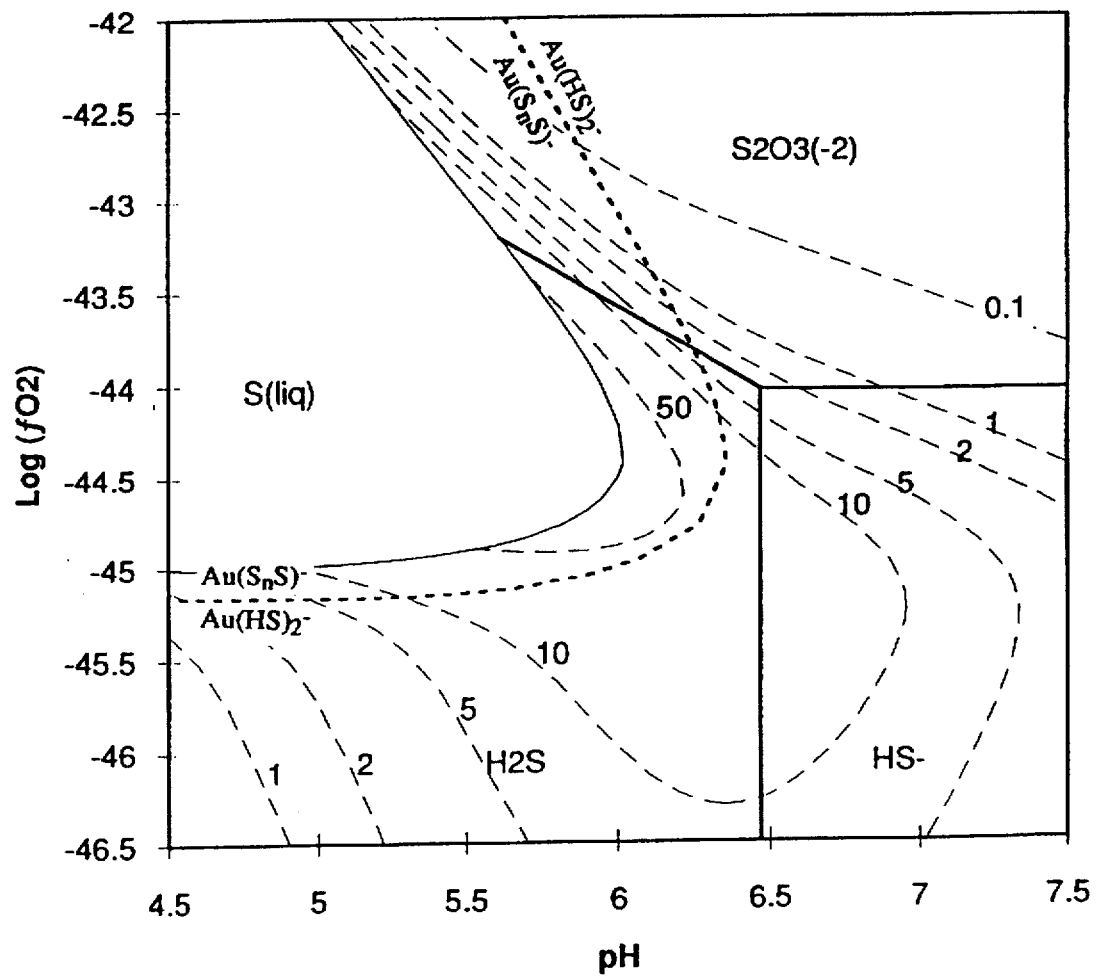
FIG. 5 shows predicted gold solubility due to complexation with polysulfide and bisulfide as a function of pH and $fO_2$ at 150° C. and 100 bars assuming that total sulfur concentration is equal to 50 mmol/kg. Contours are in mg/kg dissolved in gold. Enhancement of gold solubility by polysulfides is greatest in the region surrounding the sulfur saturation field which migrates toward higher pH as total sulfur is increased.

The presence of elemental sulfur maintains the sulfur fugacity at its highest possible level and also helps buffer the pH and Eh at optimal levels for maximizing gold solubility (Berndt et al., 1994). Theoretical calculations have shown that the highest gold solubility contours wrap around the elemental sulfur stability field in $fO_2$-pH space, as shown in FIGS. 4 and 5, with the highest solubilities occurring at the nose of the field. Comparison of FIGS. 4 and 5 shows that the absolute solubility of gold increases with increasing concentrations of dissolved sulfur at constant temperature.

Figure 6:
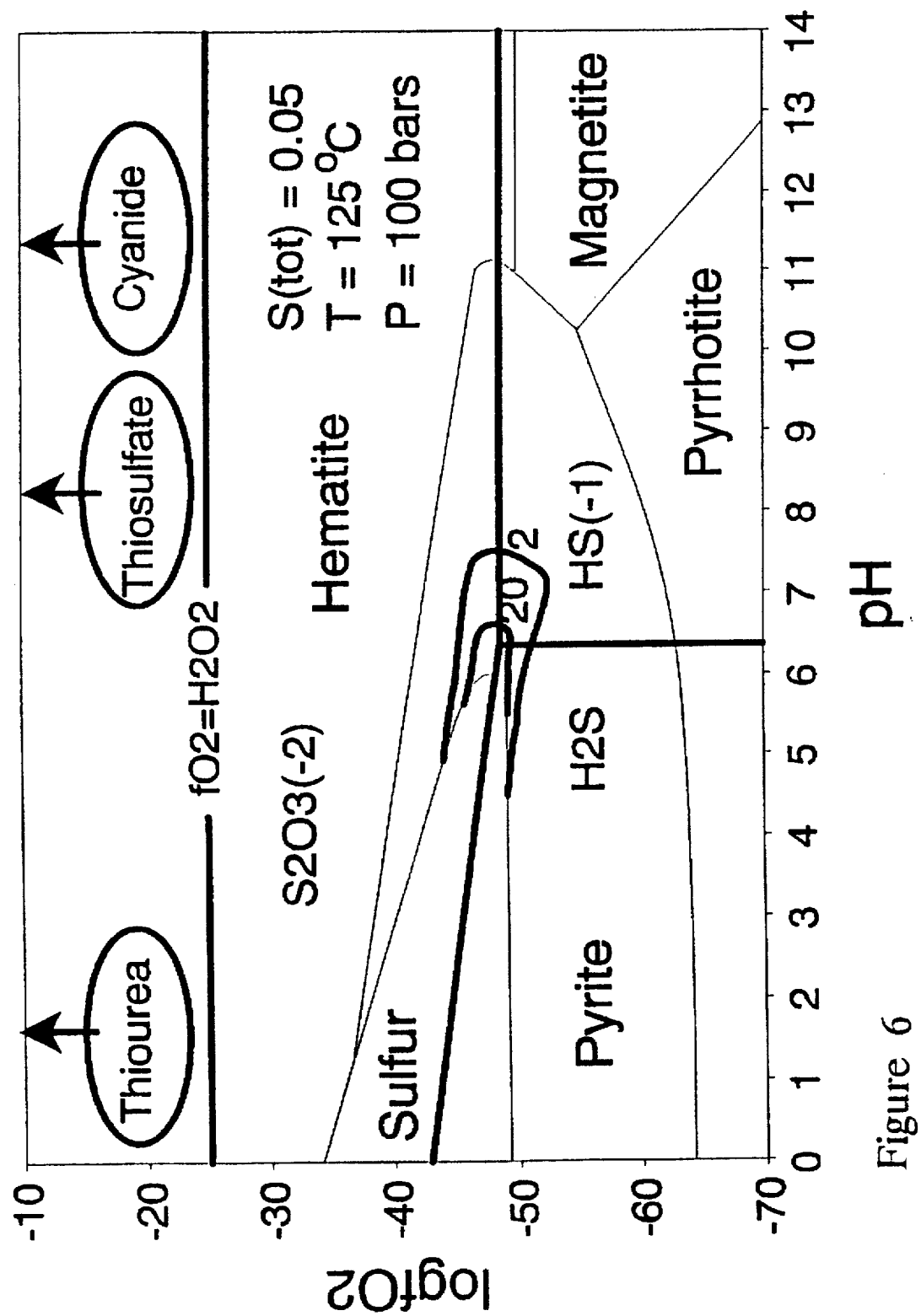
FIG. 6 is a mineral and ligand stability diagram. Maximum gold solubility contours are also shown at the nose of the sulfur-stability field.

Polysulfide ligands can also be formed using a variety of other chemical constituents. Acidification of sodium bisulfide (NaHS) solutions under slightly oxidizing conditions will produce polysulfides, co-existing with bisulfide, as the pH of the solution is titrated to near neutrality. The specific sulfide-bearing compounds used to form $HS^-$ and $S_nS^{-2}$ are not as important as the proper pH and $fO_2$ conditions. As shown in FIGS. 4 and 5, the best conditions for maximizing gold solubilities lie at the nose of the sulfur stability field. This area is near the point (on an $fO_2$-pH diagram) at which the aqueous species $S_2O_3$ or $SO_4^{-2}$, $HS^-$ and $H_2S$ have equal activities, but is generally below the predominance field for $S_2O_3$ or $SO_4^{-2}$. This area is also generally within the upper $fO_2$ stability limits of pyrite (FIG. 6). It is important to remember, however, that the relative positions of the boundaries shown in FIGS. 4 and 5 will change as the total concentration of sulfur is increased or decreased. In general, the stability field of elemental sulfur expands gradually towards higher pH values as the total sulfur concentration of the solution is increased. Hence, the gold contours and maximum solubility area will also shift towards higher pH the total S concentration is increased.

The optimum range of concentration of chemicals (i.e., NaHS, dissolved sulfur, etc.) dissolved in the aqueous solutions depends mostly upon the desired metal loadings, loading rates, and competition for polysulfide and bisulfide ligands from other unwanted metals. Although the predicted competition from unwanted metals is small, the strength of the solution can be increased significantly by increasing the amount of sulfide in solution using NaHS, $H_2S$ or other compounds, which also increases the solubility of sulfur via the following reactions:

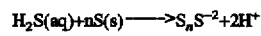

$$H_2S(aq) + nS(s) \longrightarrow S_nS^{-2} + 2H^+$$

$$HS^- + nS(s) \longrightarrow S_nS^{-2} + H^+$$

Figure 7:
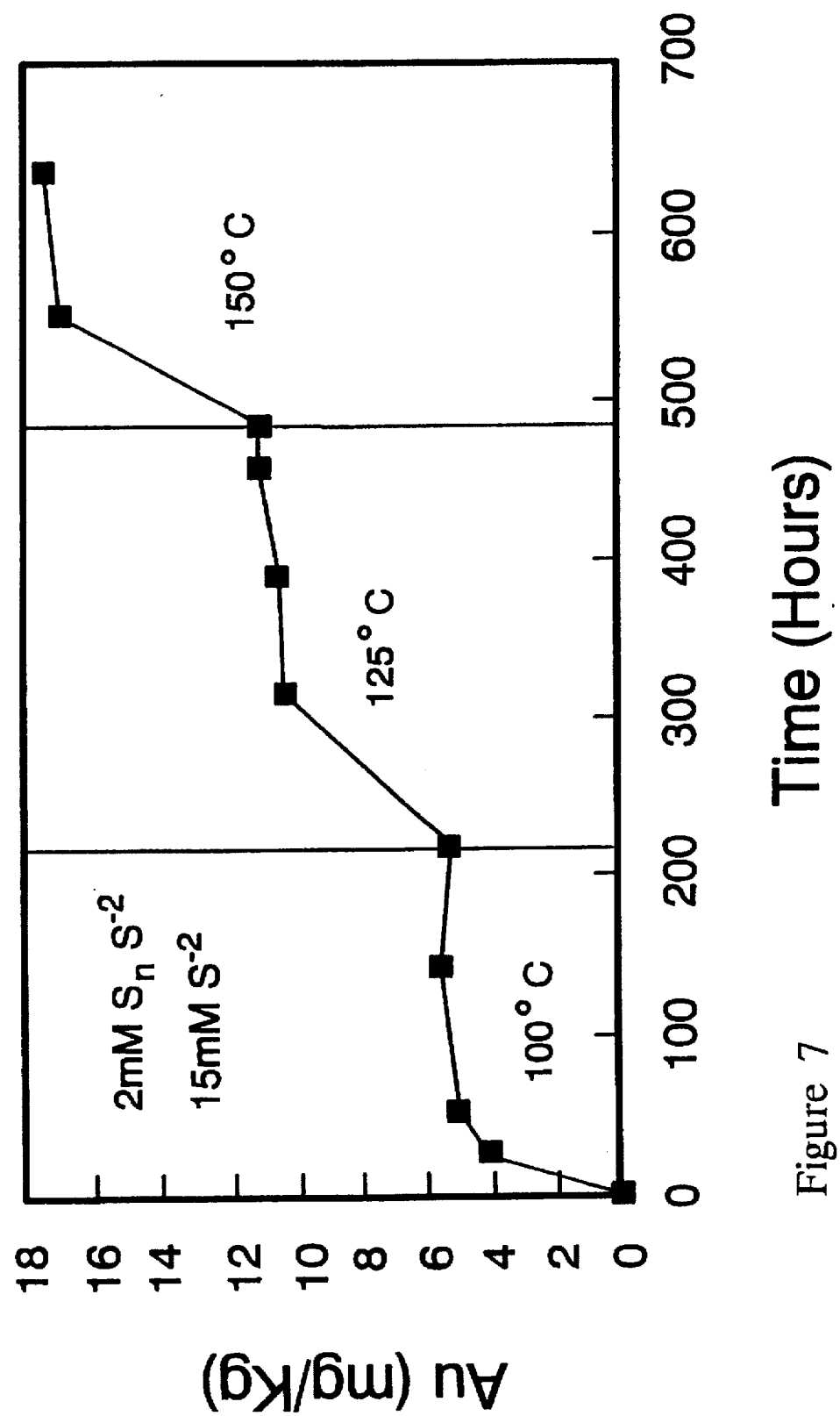
FIG. 7 shows gold concentrations in 15 mM solutions as a function of time and temperature in sulfur-bearing leach solutions during closed system experiments conducted at increasing temperatures. Equilibration is reached relatively rapidly during these experiments.

Experiments demonstrate that gold solubility increases as the temperature is increased from 100° to 150° C. (FIG. 7). FIG. 7 also shows that equilibrium, with respect to gold saturation is reached relatively rapidly during these experiments. Although gold solubilities increase at temperatures greater than 150° C., current economic considerations may preclude mining systems that operate at temperatures greater than 200° C. However, future developments in materials technology may make higher temperature solution mining and metallurgical systems feasible, in which case temperatures above 200° C. may be useful. Polysulfides become less soluble at lower temperatures, and, therefore, gold solubilities also diminish with temperature. With respect to solubility, the optimum and most practical temperature range of operation is probably 100° to 200° C. for solution mining practices including in situ and heap leaching. Higher temperatures can be used for vat leaching. Economically attractive gold values can be transported at lower temperatures.

It should be noted that native sulfur is commonly mined by the Frasch process (Ambrose, 1965), which is an in situ solution mining process that uses hot water (125°–175° C.) to melt the sulfur in a deposit and transport it to the surface of the earth in liquid form. Therefore, the technology for injection and recovery of solutions at these temperatures is already available.

The hydrostatic/lithostatic pressure of the system should not greatly affect the solubility of precious metals in the proposed leach solution so long as the pressure is high enough to maintain water in the liquid state. If a vapor phase does form, then hydrogen sulfide in the systems will partition strongly into the vapor phase (Drummond and Ohmoto, 1985), thereby decreasing the sulfur, and the solubility of gold and other previous metals in solution. This situation may result in gold precipitation before the solution is recovered. In order to avoid this situation, it is necessary to maintain pressures that are greater than the liquid-vapor univariant curve at standard operating temperatures, cf. FIG. 8.

Figure 8:
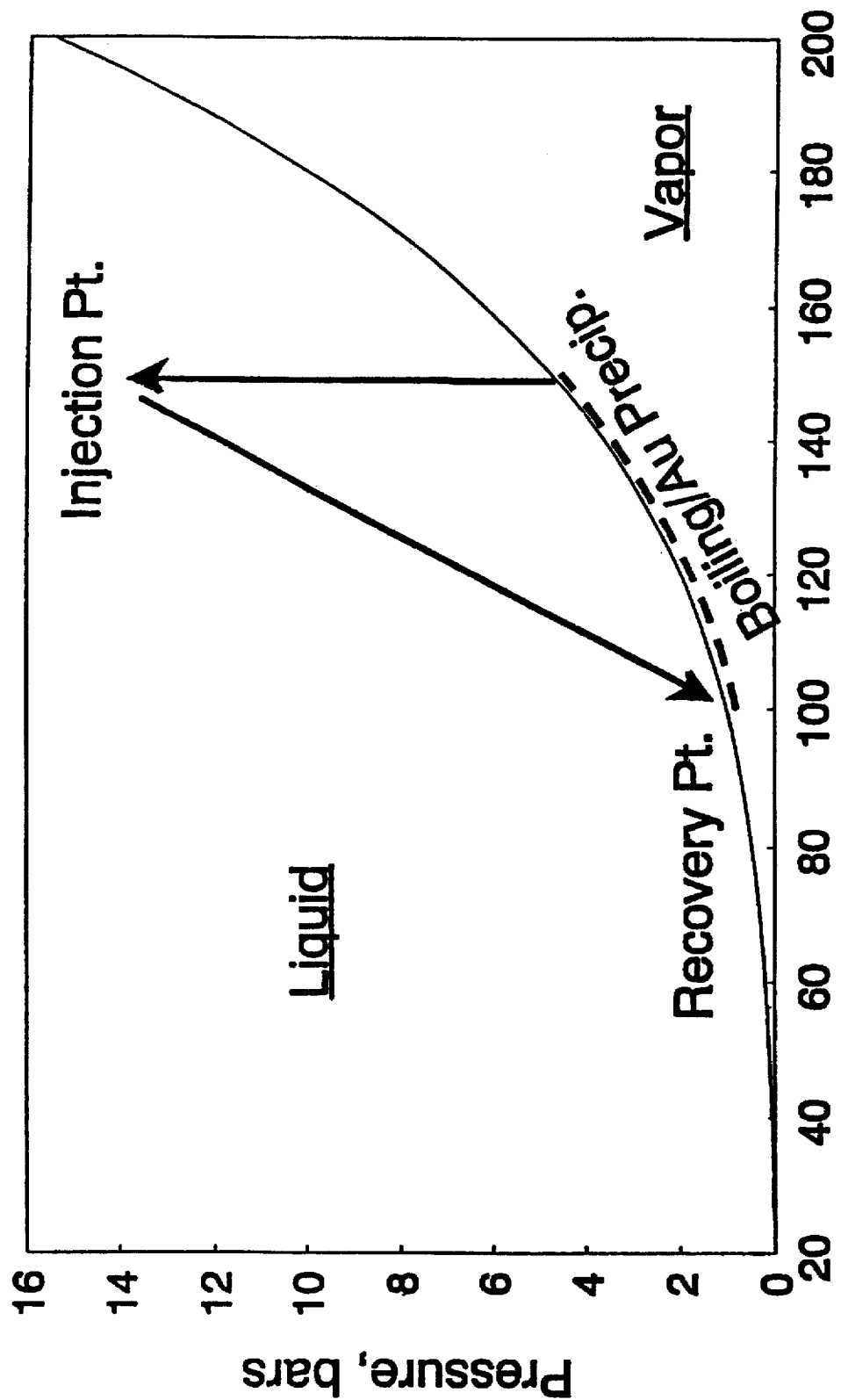
FIG. 8 is a vapor pressure curve for water and pressure temperature path of a hypothetical in situ mining operation using the leach solution of the present invention. Small amounts of controlled boiling along the liquid/vapor curve can be used to precipitate gold in a processing plant as solutions are regenerated.

FIG. 8 shows the vapor pressure curve for $H_2O$ and pressure temperature path of a hypothetical in situ mining operating using the invented leach solution. Small amounts of controlled boiling along the liquid/vapor curve can be used to precipitate gold in a processing plant (cf. FIG. 9).

Figure 9:
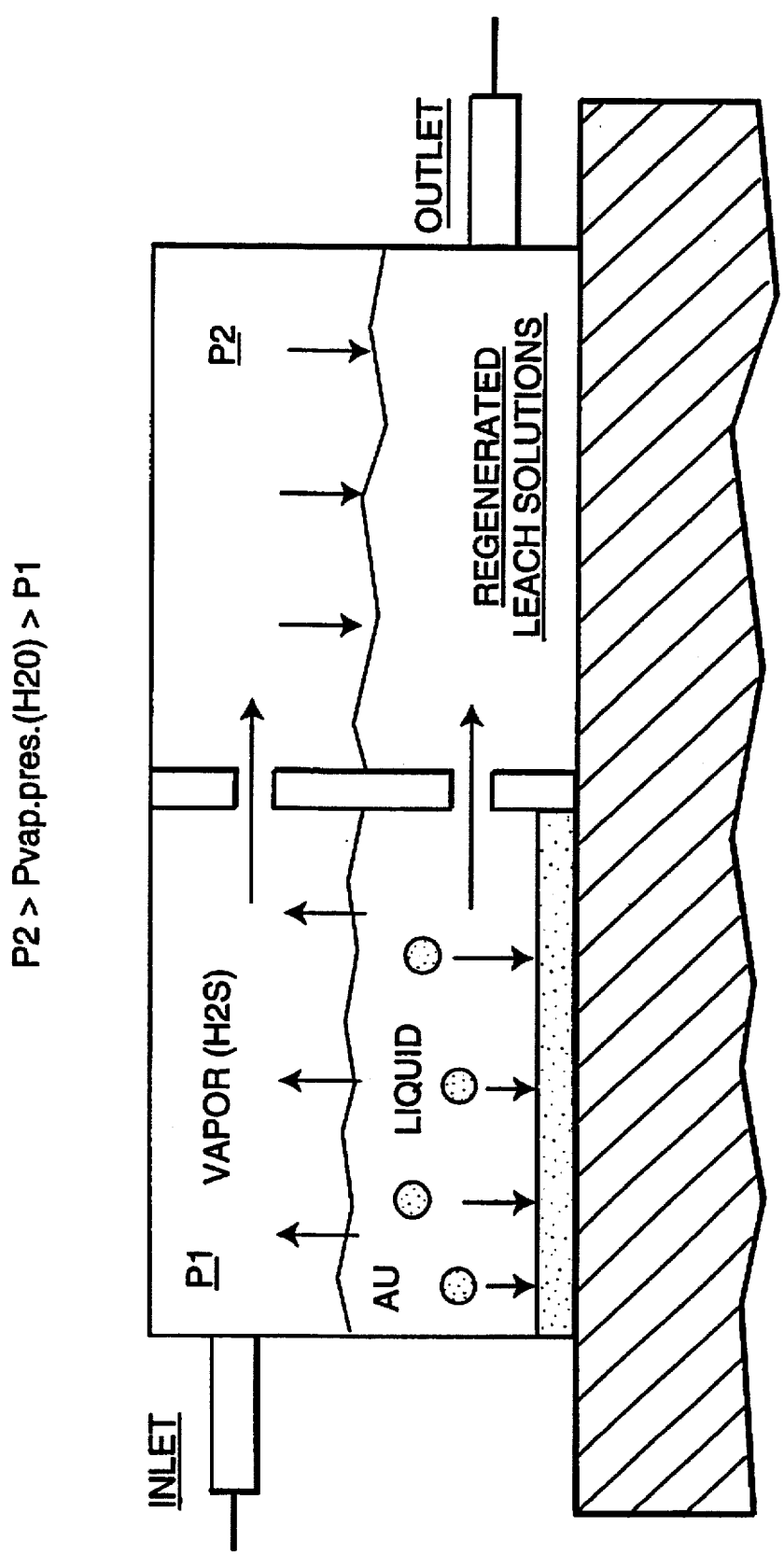
FIG. 9 is a schematic diagram of a processing plant that recovers metal values from a sulfide-bearing leach solution. Gold is precipitated during controlled boiling cooked by heating and/or depressurization. This occurs because $H_2S$ is partitioned strongly into the vapor phase. The gases can then be recombined with the liquid leach solution by pressurization, which regenerates its strength and conserves reagents.

FIG. 9 is a schematic diagram of a processing plant that recovers metal values from the leach solution of the present invention. Gold is precipitated during controlled boiling evoked by heating and/or depressurization. This occurs because hydrogen sulfide is partitioned strongly into the vapor phase. The gases can then be recombined with the liquid leach solution by pressurization, which regenerates its strength and conserves reagents.

Experimental Gold Solubility Studies

A series of elevated temperature (100°–150° C.) hydrothermal experiments were conducted involving the solubility and reactivity of gold in sulfur-bearing fluids. Two types of experiments were performed: flow-through and closed systems. The objective of the flow-through experiments was to provide information on the relative rates of gold dissolution at 100°–150° C. in bisulfide-rich solutions as the solution passed through a porous medium, while the closed system experiments provided data on the maximum (equilibrium) solubility of gold at specific temperatures and bulk fluid compositions.

Flow-through Experiments

Bisulfide-rich fluids were circulated at controlled flow rates through a core containing quartz and gold of known specific surface area. By measuring gold concentration as a function of temperature and flow rate, it was determined that gold could be dissolved sufficiently rapidly and achieve a high enough concentration to warrant further study.

The flow-through facility used for this portion of the study involved the coupling of a high pressure, flow-controlled fluid delivery system and a furnace maintained at a constant temperature and containing a packed bed core containing the minerals of interest. In this case the core contained a mixture of 3.00 grams of powdered gold, grain size 0.53μ but with fines removed by settling, and 7.26 grams of rounded quartz beads, 500–600μ grain size. The experimental design was a highly simplified mining simulation, i.e., solution mining a beach placer deposit.

After pressurizing the core, the pump was programmed to inject fluid into the core at a preselected flow rate. The fluids passed through a long inlet line which was insulated and wound with heating tape to ensure that the fluids reached their final conditions prior to entering the core.

For the first set of experiments, a mixture of dilute sulfuric acid, pH 2.3 and 10.33 mm/kg NaHS was used. A 50/50 mixture of the two fluids produced a composite fluid with equivalent amounts of $H_2S$, $HS^-$ and $SO_4^=$, where the solubility of gold owing to bisulfide complexing alone achieved maximum values.

After reacting with minerals in the core, the fluids were collected and prepared for analysis by ICP-mass spectrometry using matrix matched gold-bearing standards. Platinum concentrations of known amounts were added to blank standards and samples in order to correct for signal drift which accompanies all analyses performed by ICP-MS. Repeat gold analysis and comparison with standards indicated that the reported gold concentrations were accurate to within 2% of the actual value.

Results

Samples were obtained from experiments at flow rates of 0.05 and 0.1 mLs/min and for temperatures of 100°–150° C., as shown in Table 1. The gold concentrations shown in Table 1 range from about 1 ppm up to 2.88 ppm after only 1–2 hours of reaction. The highest gold concentrations were achieved when flow rates were low and temperatures high. The measured concentrations from all samples greatly exceeded preliminary estimates of gold solubility in bisulfide-rich solutions which were based on currently available experimental data obtained at slightly higher temperatures (Shenberger and Barnes, 1989). These results indicate that other sulfur species were helping to enhance the solubility of gold and increase the rate of dissolution. Apparently, when $SO_4^=$, whose sulfur has a valency of +6, combines at 100°–150° C. with $HS^-$, which has a sulfur valency of –2, the result is formation of a large amount of zero-valent sulfur and species with mixed valences such as polysulfides, thiosulfates, and supersulfides. Whereas Shenberger and Barnes performed most of their experiments at high temperatures and low $S_2$ fugacity ($fS_2$), in which polysulfides and other sulfur species of intermediate redox states were not present, the present experiments were conducted at high $fS_2$ and generally lower temperatures where these species are present.

Polysulfides and thiosulfate generally dominate the sulfur chemistry of fluids and high $fS_2$ and relatively low temperatures below about 200° C., cf. Giggenbach, 1974. Polysulfides predominate at intermediate pH and high $S^{2-}$ activity. Both of these species are insoluble at low pH. These experiments demonstrate that the species which dominated the high $fS_2$ fluids in our experiments not only acted as strong catalysts for oxidizing and mobilizing gold, but can also maintain high dissolved concentrations of gold.

Although the above experiments showed that native gold can be highly reactive and soluble at 100° and 150° C., they did not reveal the identity of the key complexing agent, nor could they reveal the maximum potential solubility of gold. The next experiments were designed to identify the key species involved in mobilizing gold at these low temperatures. This could best be accomplished by performing a series of carefully designed experiments under controlled $fS_2$ and $fO_2$ conditions.

Closed System Experiments

The best way to control $fS_2$ and $fO_2$ was with chemical buffers. In the following experiments, $fS_2$ was controlled by including elemental sulfur as a reactant. Although $fO_2$ was not buffered by minerals, it was controlled by adding known amounts of bisulfide. Addition of native gold to the system buffered the activity of $Au^+$, assuming knowledge of $fO_2$ and pH. Although the reaction cell was composed of gold, powdered gold was also added to the system in order to increase the specific surface area and to accelerate attainment of equilibrium gold concentrations to values that would be more representative of fine gold in natural ores. By buffering solutions containing NaHS with native gold and native sulfur, and by measuring resultant dissolved gold and sodium concentrations in addition to total sulfur and total monosulfide, it was possible to obtain thermodynamically interpretable gold solubility data.

The hydrothermal apparatus used for the experiments is similar to that disclosed by Seyfried et al, 1987. Reactants were loaded into a cell (70 mL total volume) composed of gold and titanium inert materials which was itself loaded into an autoclave. The entire autoclave was loaded into a furnace assembly.

The initial fluid added of the experiments was a relatively weak NaHS solution (11.42 mmol/kg) which upon heating, in the presence of native sulfur converted to a solution containing bisulfide, polysulfides, thiosulfate, and hydrogen sulfide. Other solutions were added later to change the composition of the solution.

As noted above, total sulfur, total monosulfide, and total sodium ions were analyzed in addition to dissolved gold. The evolved solutions were collected in gas-tight syringes and were then analyzed directly for total sulfur, total gold and total sodium concentrations by ICP-mass spectroscopy. Platinum was used as an internal standard for gold, while scandium was used as an internal standard for sodium and total sulfur. The analytical precision for each of these species was less than 2% where internal stands were used.

A separate, non-acidified sample was taken into a gas-tight syringe for total monosulfide analysis. The contents of the syringe were immediately injected into a 2.5 molar phosphoric acid solution to volatilize the monosulfide as $H_2S$. The $H_2S$ was trapped as $Ag_2S$ by bubbling the carrier gas through a solution containing $AgNO_3$. The resulting $Ag_2S$ was filtered, dried and weighted to determine the total monosulfide concentration in the solution. Error on this analysis was estimated to be approximately ±20 ppm $S^{-2}$.

Results

Table 2 and FIG. 7 reveal that equilibrium gold concentrations were achieved relatively rapidly and varied considerably as a function of temperature and solution chemistry. The highest concentrations were achieved at the highest temperatures and generally for the more sulfur-rich fluids.

Present evidence suggests that gold concentrations track more closely with polysulfide species than they do with thiosulfate of bisulfide species. For example, if gold-thiosulfate and gold-bisulfide species were the dominant complexing agent for the gold, one would have expected dissolved gold concentrations of be similar for Au-S-6 and Au-S-16. However, this is not what was observed. What was found, however, was that gold concentration appeared to decrease in approximate proportion to calculated polysulfide levels. Using these experimental findings and the thermodynamic data of Hamilton (1991) and Johnson et al. (1992), the concentrations of gold in solution can be predicted as a function of temperature $fS_2$, pH and total dissolved sulfur concentrations. FIGS. 4 and 5 were thus constructed in order to illustrate the solubility of gold as a function of $fO_2$, pH, and total dissolved sulfur.

The results from these experiments suggest that polysulfide species are the most likely agents for creating these high solubilities and rapid dissolution rates of gold. These experiments which suggested that high gold concentrations can be achieved using relatively low bisulfide concentrations at high $fS_2$ and at elevated temperatures (100°–150° C.). Therefore, polysulfide-bearing, high $fS_2$ fluids show great promise for use in solution extraction of gold from ore deposits and ore concentrates.

Distribution and Recovery of Leach Solutions

The types of solution mining and hydrometallurgical practices that can be used to deliver and recover the leach solution of the present invention are varied: in situ, heap, and vat leaching mining systems are the major types of mining and hydrometallurgical practices that could be used. Cyanidization has been the most successful leach mining technique to date for precious metals, but has only been widely applied to heap and vat leaching, and not in situ mining because of the environmental regulations pertaining to underground injection of cyanide.

For the reasons stated above, the preferred embodiment of the present invention is in situ mining, mainly because the leach solution of the present invention is relatively dilute and non-toxic. Therefore, there is very little risk to the environment when injecting the leach solution of the present invention into natural or slightly modified rock formations. Sodium cyanide and other strong chemicals have been used as leach solutions for heap and vat leach mining operations of precious metals ores because a physical barrier is constructed to contain the cyanide solution. No totally reliable barrier technologies have yet been developed for in situ mining.

During in situ mining operations the leach solution of the present invention is formulated in a heated tank resting at the surface of the earth approximately above the ore body. The leach solution is preferably injected into the ore horizon via a single or a series of injection wells at a high enough temperature such that the solution is still hot enough to transport gold and other precious metals at economical concentrations by the time it reaches the recovery well. The well pattern (spacing, etc.), injection temperature and pressure and recover well back-pressure (required to prevent boiling) must be designed and constructed to maintain the solution at optimal physical and chemical conditions, i.e., temperatures from about 100°–200° C. and pressure sufficiently high to prevent vapor formation. In some cases it may be desirable to pre-heat the formation with heated water prior to injecting the leach solution until the injection and recovery system sustains the desired conditions. In very deep ore bodies or in areas of high geothermal gradients, the rocks may already be at the desired temperature.

In most applications, the solution chemistry can be maintained at the desired pH and Eh conditions by deliberate deposition of sulfur in porespaces. This will be accomplished during injection of sulfur-saturated solutions as temperatures decrease from injection to recovery wells because the solubility of native sulfur decreases with decreasing temperatures. A temperature drop of only a few degrees is enough to deposit a small amount of sulfur in the pores of the formation such that the leach solution chemistry will be buffered at optimal condition by its presence. Alternatively, a small amount of molten sulfur could be entrained in a hot (150°–175° C.) aqueous slurry and injected in the formation where it will accumulate in pores and fractures by density separation and solidification if temperatures fall below 119° C., the freezing point of sulfur. Elemental sulfur can also be generated in situ by introducing selected species of bacteria that either reduce sulfate or oxidize sulfide to elemental sulfur. Regardless of the exact method used to introduce sulfur into the deposit, this measure will ensure that polysulfide ligand will be available to dissolve and transport gold as gold-polysulfide complexes.

After injection of the leach solution, gold loading in solution should increase towards equilibrium values within a few hours to a few days, depending upon the flow rate, temperature, solution composition, etc. The metal values are gained when the hot, sulfur-bearing solution contacts ore particles in the rock horizon. The metal-laden solution then flows towards the recovery well and is recovered there by pumping, air-lifting, artesian flow or some other suitable means. The precious metals are recovered from the leach solution through adsorption, precipitation, electroplating, or some combination of these processes, or any other suitable means. The now barren leach solutions are regenerated by heating or sulfur augmentation, if necessary, and then returned to the wellfield to be reinjected, thus completing the circuit.

Recovery of Metal Values

Metals can be conveniently recovered from the leach solution of the present invention by taking advantage of the fact that hydrogen sulfide gas will partition strongly into the vapor phase if present (Drummond and Ohmoto, 1985). Hydrogen sulfide gas evolves during boiling resulting in a decrease in $fS_2$ as a result of the loss of sulfur. This action causes gold to precipitate from solution. By driving off the hydrogen sulfide gas at the surface of the earth in an enclosed tank, the gold will precipitate from solution for recovery.

In recovering precious metals from a leach solution, the precious metals are leached from an ore body using the leach solution of the present invention. The metal-laden solution is recovered by pumping, air-lifting, or artesian flow towards the recovery well, The solutions are then directed into an enclosed tank at a high enough pressure to prevent boiling corresponding to the specific temperature of the solution (cf. FIG. 9). If the pressure of the solution is then permitted to drop to the boiling point (cf. FIG. 8), hydrogen sulfide gas will then evolve with the vapor. The resulting decrease in gold solubility then triggers precipitation of gold and sulfur. The solutions (now almost completely barren of gold) and gases are then directed out of the precipitation tank to another storage tank containing native sulfur (FIG. 9). The two phases are then heated and repressurized to just above the injection temperature and the injection pressure, respectively (FIG. 8). At this stage, the temperature is allowed to drop to the injection temperature (FIG. 8) which recondenses the vapor phase and regenerates the desired chemical properties of the leach solution. At that point the leach solution can be returned to the wellfield.

Figure 10:
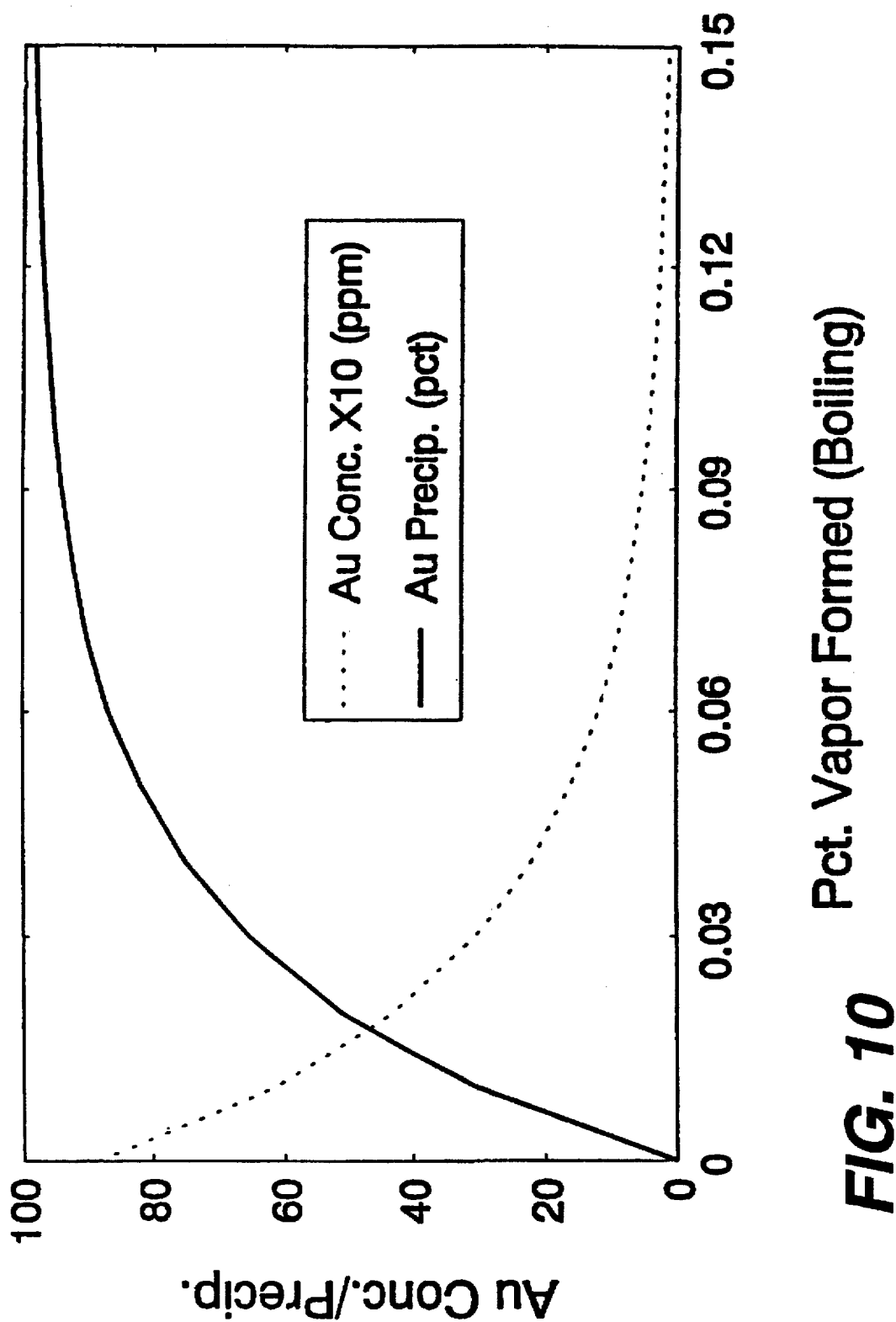
FIG. 10 shows gold precipitation as a function of isothermal (125° C.) closed-system boiling. The initial (preboiling) total sulfur and total sulfide concentrations are 0.27 and 0.15 m/kg, respectively. The initial conditions are characterized by an equilibrium gold concentration of 8.8 ppm.

FIG. 10 illustrates the calculations which show that only a small amount of boiling is necessary to trigger gold precipitation. FIG. 10 shows gold precipitation as a function of isothermal (125° C.) closed-system boiling. The initial, preboiling, total sulfur and total sulfide concentrations are 0.267 and 0.15 mg/kg, respectively. The initial conditions are characterized by an equilibrium gold concentration of 8.8 ppm. That is, FIG. 9 shows that only 0.15% closed-system boiling is required to recover slightly more than 99% of the gold from pregnant leach solutions at 125° C. Because closed-system boiling is so highly efficient, hydrogen sulfide gas does not have to be vented to the atmosphere as it would during open system boiling which is only slightly more efficient. In addition to eliminating any significant atmospheric emission of undesirable hydrogen sulfide gas, the closed system gold recovery process shown in FIG. 9 also facilitates recycling of reagents. As hydrogen sulfide is lost to the vapor phase, the reaction:

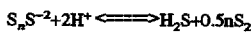

shows that mass is partitioned to the right-hand side of the equilibrium, thereby lowering the concentration of polysulfide ions and raising the pH. Sulfur fugacity ($fS_2$) decreases while $fO2$ increases during boiling according to the reaction:

Which, taken with the above equations, also contributes towards the loss of polysulfide ions, rising pH, and precipitation of gold as follows:

Gold precipitation from hot, sulfur-bearing fluid during boiling events has been observed in laboratory experiments and in geothermal wells (Brown, 1988).

ALTERNATE EMBODIMENTS OF THE INVENTION

The leach solutions of the present invention can also be used in heap and vat leaching operations as well as in in situ mining operations if the optimum physical and chemical conditions described above are maintained. The fundamental principal whereby a leach solution contacts an ore mineral, dissolves the desired metal and transports it in solution to the processing plant is ubiquitous to all of the solution mining operations. However, in heap and vat leaching the ore is energetically reduced to rubble or finer sized material and heaped into a pile or tank. Leach solutions are then usually applied to the top of the heap with sprinklers or other dispersion devices rather than injected into the ores such that leach solutions percolate through the ore to the bottom of the pile under the influence of gravity. In open heaps, this means that the pressure of the system is always near atmospheric, therefore temperatures greater than about 100° C. cannot be used because the solution will vaporize unless a reactively strong electrolysis solution is used to raise the boiling point. Gold solubilities in sulfur-bearing solutions at or near 100° C. are still high enough, however, to be economically viable. If the solution temperature does not drop significantly before it is recovered, then the leach solution of the present invention may be used to recover previous metals from ore heaps. It can be appreciated that temperature control is a key issue in this type of setting. By contrast, the solution chemistry will be relatively easy to control because native sulfur can be mixed with the broken ore during the heaping process. Alternatively sulfide mineral in the ore itself can produce sulfur by natural or augmented oxidation. The presence of native sulfur maintains pH and Eh conditions at the optimal levels for dissolving gold with the leach solution of the present invention. Retrieval of metal values from the loaded leach solutions during heap and vat leaching can be accomplished by the above-described methods.

Vat leaches are similar to heap leaches with respect to control of leach solution and communition of the rock to liberate ore particles. However, solution temperature as well as saturation conditions can be better controlled and maintained more readily in a tank or vat if the vessel is enclosed and properly insulated. Pressures can also be controlled if the tank is sealed, which allows temperatures greater than 100° C. to be employed. Therefore, vat leaching with the leach solution of the present invention should be relatively easy and effective so long as native sulfur is mixed with the ore material prior to leaching, or if sulfide minerals in the ore itself produce sulfur by natural or augmented oxidation. Retrieval of metal values from the loaded leach solutions during heap and vat leaching can be accomplished by any of the above-described methods.

Advantages of the Present Invention over Conventional Mining Methods

Gold solubilities in the leach solution of the present invention compare favorably with those commonly achieved with sodium cyanide solutions which are conventionally used in heap and vat leaching operations. More importantly, the leach solutions of the present invention are more compatible with the environment than cyanide, because the present leach solution is non-toxic, uses very simple and naturally-occurring substances, and is effective at neutral pH and very low total sulfur concentrations. This is particularly important for in situ mining, where physical barriers are generally nonexistent.

Because the leach solutions of the present invention contain very dilute concentrations of sulfur and will be at neutral pH and relatively reducing chemical conditions, there will be minimal regulation with respect to underground injection and other types of discharge. Even if leach solutions do escape, the already low levels of sulfur in the leach solutions will fall off rapidly as the warm solutions mix with cool groundwater because the solubility of sulfur decreases very significantly as temperatures fall. The effect of decreasing solubility with temperature combined with dilution by groundwater-leach solution mixing should be sufficient to attenuate the leach solution completely to natural levels at or very near the perimeter of the wellfield.

The optimum pH and Eh for the leach solution of the present invention is similar to natural redox conditions in saturated rocks. This means that the lixiviant should not react strongly with groundwater or minerals in the host rock which is highly desirable, because chemical consumption and changes in chemical conditions away from optimum conditions are minimized. The gangue minerals present in the ore are more likely to be in equilibrium with the leach solution of the present invention, thereby avoiding vigorous gangue-leach solution reactions which can consume reagents and release deleterious byproducts, including metals and acid. Pyrite is one important gangue mineral that is in equilibrium with the leach solution of the present invention over the range of conditions under which the solution is used (FIG. 6). Pyrite tends to react with and consume reagents in some other leaching systems, especially strong oxidants, including those based on sodium cyanide. The lixiviant of the present invention also has a high buffer capacity, especially in the presence of native sulfur, and tends to resist changes from the optimum conditions as a result of fluid-rock interactions.

The great variety of reagents that can be used to formulate the leach solution of the present invention, such as NaHS, elemental sulfur, hydrogen sulfide, sulfuric acid, and the like are very inexpensive and are widely available. This flexibility is very important from an economic perspective because the price of the reagents is not sensitive to supply and demand, and the most appropriate sources can be used, depending upon location of the mine. Hydrogen sulfide and sulfuric acid are often produced as by-products or waste products during various mineral development and processing operations, particularly in the western U.S. where the precious metals deposits are most prevalent. These substances can be used profitably rather than disposed of for mining precious metals using the process of the present invention.

The recovery process described herein is specific to the leach solution of the present invention. However, it is not the only method that can be used to process leach solutions and recover the dissolved metal values. This is superior to conventional processing systems such as zinc recovery, carbon absorption, ion exchange, electrowinning, etc., in many respects. The metal recovery process only requires the manipulation of pressure and temperature, which is already a requirement of the leaching system, and does not depend upon consumables such as zinc dust, carbon columns, resins, nor does it require complicated equipment such as solvent extraction and electrowinning. The process of the present invention also conserves the reagents and produces a very pure product in the form of a precipitate of the free precious metal.

The foregoing description of the specific embodiments will so fully reveal the general nature of the invention that others can, by applying current knowledge, readily modify and/or adapt for various application such specific embodiments with out departing from the generic concept, and therefore such adaptations and modifications are intended to be comprehended within the meaning and range of equivalents of the disclosed embodiments. It is to be understood that the phraseology or terminology herein is for the purpose of description and not of limitation.

All references cited in this specification are hereby incorporated by reference.

TABLE 1

Au Concentrations in Selected Flow-through Experiments Conducted at Approximately 100 bars

| Sample | Flowrate* | T (°C.) | Au(ppb) |
|---|---|---|---|
| AU-1-1 | .1 | 100 | 1175 |
| AU-2-3 | .05 | 100 | 1664 |
| AU-3-3 | .1 | 150 | 1313 |
| AU-3-4 | .05 | 150 | 2876 |

*flow rate in mls/min

TABLE 2

Equilibrium Gold Solubilities in Selected Closed System Experiments Conducted at 100 bars

| | Temp (°C.) | pH* | Au(total) | S(−2)** | S(total) |
|---|---|---|---|---|---|
| A-S-0 | 20 | 8.386 | 0 | 380 | 380 |
| A-S-3 | 100 | 7.095 | 5.50 | 391 | 725 |
| A-S-11 | 100 | 7.105 | 6.57 | 378 | 604 |
| Au-S-6 | 125 | 6.803 | 11.12 | 500 | 818 |
| Au-S-10 | 125 | 6.837 | 11.35 | 468 | 732 |
| Au-S-16 | 125 | 6.851 | 6.04 | 376 | 566 |
| A-S-8 | 150 | 6.677 | 17.91 | 597 | 830 |
| A-S-18 | 150 | 6.822 | 9.80 | 352 | 648 |

**The calculated distribution of polysulfides and other species are provided in Berndt et al., 1994.

What is claimed is:

1. A process for solution mining of precious metals comprising adding to ore containing precious metals an aqueous leach solution comprising bisulfide or sulfide ions in the presence of excess elemental sulfur at a temperature of at least 100° C. to dissolve said precious metals, and recovering a metal bearing solution containing said precious metals.

2. The process according to claim 1 wherein said aqueous leach solution contains bisulfide or sulfide ions obtained from a compound selected from the group consisting of NaHS, Na$_2$S, H$_2$S, (NH$_4$)$_2$S, and mixtures thereof.

3. The process according to claim 1 wherein said elemental sulfur is introduced into said ore prior to or along with said aqueous leach solution.

4. The process according to claim 1 wherein said ore is contacted at or above pressures above the liquid-vapor curve for H$_2$O.

5. The process according to claim 1 wherein said precious metals are selected from the group consisting of gold and silver.

6. The process according to claim 1 wherein said solution mining is in situ mining.

7. The process according to claim 1 wherein said solution mining is heap mining.

8. The process according to claim 1 wherein said solution mining is vat mining.

9. The process according to claim 1 wherein metal values are recovered from said aqueous leach solution by boiling.

10. The process according to claim 1 wherein said leach solution is regenerated by condensation of separated phases generated by boiling.

11. The process according to claim 9 wherein sulfur is added to said aqueous leach solution after heating.

12. The process according to claim 1 wherein said precious metals are recovered from said aqueous leach solution by a method selected from the group consisting of absorption, precipitation, electroplating, or a combination thereof.

13. The process according to claim 1 wherein said precious metals are recovered from said metal bearing solution by driving off hydrogen sulfide gas produced in the process.

14. The method according to claim 13 wherein said hydrogen sulfide is recycled into said aqueous leach solution.

* * * * *